(12) United States Patent
Schlangen

(10) Patent No.: US 8,579,349 B1
(45) Date of Patent: Nov. 12, 2013

(54) HEADREST ASSEMBLY

(76) Inventor: Phillip E. Schlangen, Minneapolis, MN (US)

( * ) Notice: Subject to any disclaimer, the term of this patent is extended or adjusted under 35 U.S.C. 154(b) by 22 days.

(21) Appl. No.: 13/374,897

(22) Filed: Jan. 23, 2012

(51) Int. Cl.
*B60N 2/48* (2006.01)
(52) U.S. Cl.
USPC .......................................... 296/63; 297/395
(58) Field of Classification Search
USPC .............. 296/63, 64, 65.01, 65, 68.1, 187.05; 280/749, 751; 297/391, 395, 403, 406, 297/407, 216.12
See application file for complete search history.

(56) References Cited

U.S. PATENT DOCUMENTS

| | | | | |
|---|---|---|---|---|
| 2,833,554 | A * | 5/1958 | Ricordi | 280/751 |
| 3,762,505 | A * | 10/1973 | Morse | 188/371 |
| 3,964,788 | A * | 6/1976 | Kmetyko | 297/395 |
| 4,458,919 | A | 7/1984 | Kawashima et al. | |
| 4,838,575 | A * | 6/1989 | Livingston | 280/748 |
| 4,869,448 | A * | 9/1989 | Kenyon | 248/118 |
| 4,880,275 | A * | 11/1989 | Lanteri | 297/391 |
| 4,881,777 | A * | 11/1989 | Dorshimer | 297/406 |
| 4,989,836 | A | 2/1991 | Hudson et al. | |
| 5,346,282 | A * | 9/1994 | De Filippo | 297/395 |
| 5,868,452 | A * | 2/1999 | Grieger | 296/68.1 |
| 6,352,285 | B1 * | 3/2002 | Schulte et al. | 280/756 |
| 6,557,893 | B2 * | 5/2003 | Sauermann | 280/748 |
| 6,726,435 | B1 | 4/2004 | Williams et al. | |
| 6,752,422 | B2 * | 6/2004 | Sauermann | 280/748 |
| 6,758,527 | B2 * | 7/2004 | Schambre et al. | 297/395 |
| 7,284,944 | B1 * | 10/2007 | Schlangen | 414/541 |
| 7,347,658 | B2 * | 3/2008 | Schlangen | 414/541 |
| 7,597,395 | B2 * | 10/2009 | Wiedeman et al. | 297/248 |
| 7,854,576 | B2 * | 12/2010 | Girardin et al. | 410/9 |
| 8,398,356 | B2 * | 3/2013 | Sandoz | 414/541 |
| 2003/0214168 | A1 * | 11/2003 | Schambre et al. | 297/391 |
| 2004/0090056 | A1 * | 5/2004 | Sung | 280/751 |
| 2007/0059136 | A1 * | 3/2007 | Schlangen | 414/467 |
| 2007/0170742 | A1 * | 7/2007 | Hansen | 296/64 |
| 2011/0070057 | A1 | 3/2011 | Kitchin et al. | |
| 2012/0294699 | A1 * | 11/2012 | Sandoz | 414/539 |

* cited by examiner

*Primary Examiner* — Glenn Dayoan
*Assistant Examiner* — Gregory Blankenship
(74) *Attorney, Agent, or Firm* — Richard O. Bartz

(57) ABSTRACT

A headrest assembly for a motor vehicle has an upright column secured to the vehicle supporting an arm movable between first and second positions with an actuator. An attachment connected to the arm supports a head restraint pad located behind the head of a person seated in a wheelchair in the vehicle operator's position or front vehicle passenger's position.

25 Claims, 11 Drawing Sheets

HEADREST ASSEMBLY

CROSS REFERENCE TO RELATED APPLICATION

None.

FIELD OF THE INVENTION

The invention relates to a headrest assembly for a motor vehicle adapted to transport a wheelchair with a person seated thereon. The headrest assembly provides a head restraint for a person seated in the wheelchair located in the vehicle's operator's position or front passenger position.

BACKGROUND OF THE INVENTION

Whiplash neck injury is a common injury to a person following a motor vehicle crash. Whiplash causes a rapid hyperextension of the cervical spine in which the person's head is thrown back creating large angular displacements. The extension phase builds energy in the elastic components of the neck and is followed by an abrupt release of energy and forward thrust of the head and neck. The result of whiplash includes injury of a number of structures in the person's neck including intervertebral discs, facet joints, ligaments, muscles, nerves and paralyzing spinal cord injury. Most persons will recover from whiplash in a short period of time. However, a significant number of persons with whiplash injuries transition to chronic pain conditions where treatment is long term with expensive musculoskeletal conditions to treat.

Passenger cars have been required by the Federal Motor Vehicle Safety Standard since January 1969 to provide head restraints for each designated front-outboard seating position. The head restraint requirement was extended to light trucks, multipurpose passenger vehicles and buses. The head restraint requirement includes vans and trucks used to transport persons seated in wheelchairs located in vehicle operators and front seating positions. The head restraint must withstand a rearward load of 200 pounds and be located at least 27.5 inches above the seating reference point.

Conventional wheelchairs are not equipped with head restraints. Headrest attachments are available as attachments for use with wheelchairs. E. W. Hudson and L. B. Anderson in U.S. Pat. No. 4,989,836 discloses a wheelchair headrest attached to opposite vertical upright frame members. The headrest includes two resilient head supports for preventing involuntary head movement of a person seated in the wheelchair. Wheelchair head restraints do not have the strength necessary for a head restraint required for motor vehicles. Also, wheelchair back rests are not designed to accommodate substantial rearward loads during a motor vehicle crash.

Motor vehicles, such as pickup trucks and vans, have been equipped with wheelchair lifts that move a wheelchair with a person seated thereon from a ground position to a vehicle operator position. C. Williams and J. DeVal in U.S. Pat. No. 6,726,435 disclose a personal mobility lift for a motor vehicle operable to move a wheelchair from an outside location through the door opening to the vehicle operator's position. The lift and wheelchair do not include head restraints. S. L. Kitchin and K. J. Schlosser in U.S. Patent Publication No. US 2011/0070057 disclosed a pickup truck with an extended cab equipped with a wheelchair lift mechanism for moving a wheelchair into and out of the cab. When the wheelchair is in the cab, it is located in the vehicle operator's position. The wheelchair lift does not include a head restraint for the head of the person seated in the wheelchair. P. E. Schlangen in U.S. Pat. Nos. 7,284,944 and 7,347,658 disclose a wheelchair lift assembly operable to elevate a platform supporting a wheelchair from a ground position to a vehicle operator's position. The lift assembly has a head restraint located behind the head of the person seated in the wheelchair when the wheelchair is in the vehicle operator's position. Motor vehicles equipped with wheelchair lift devices located on the sides or rear of the vehicle do not include headrest assemblies that allow the wheelchair with a person seated thereon to be moved into and out of vehicle operator's or front passenger positions.

SUMMARY OF THE INVENTION

The headrest assembly of the invention provides a motor vehicle, such as a van, pickup truck or bus, with head restraint pads for persons in wheelchairs located in either vehicle operator or front passenger positions. The headrest assembly locates the head restraint pad behind the back of the head of the person seated in the wheelchair to reduce whiplash injury in the event of a vehicle crash. The headrest assembly has an upright column connected to the floor and additional frame structure of the vehicle to fix the location of the column in the vehicle's interior compartment. A horizontal arm is movably mounted on the column for movement between first and second positions. An attachment connected to the arm supports a head restraint pad which is movable with the arm between a first position behind the head of the person seated in the wheelchair to a second position spaced from the head of the person seated in the wheelchair. The head restraint when in the first position is in close proximity to the back of a person's head of a person seated in the wheelchair. Moving the head restraint pad from the first position to the second position remote from the person's head and wheelchair allows the wheelchair to be moved into and out of the vehicle operator or front passenger positions. An actuator is operable to move the arm between the first and second positions and retain the arm in either position. The actuator is a linear piston and cylinder assembly having a threaded member driven by an electric motor to expand and contract the piston and cylinder assembly to move the arm between the first and second positions thereby moving the head restraint pad to a first position behind the head of the person seated in the wheelchair to a second position spaced from the head of the person seated in the wheelchair.

DESCRIPTION OF THE INVENTION

Figure 1:
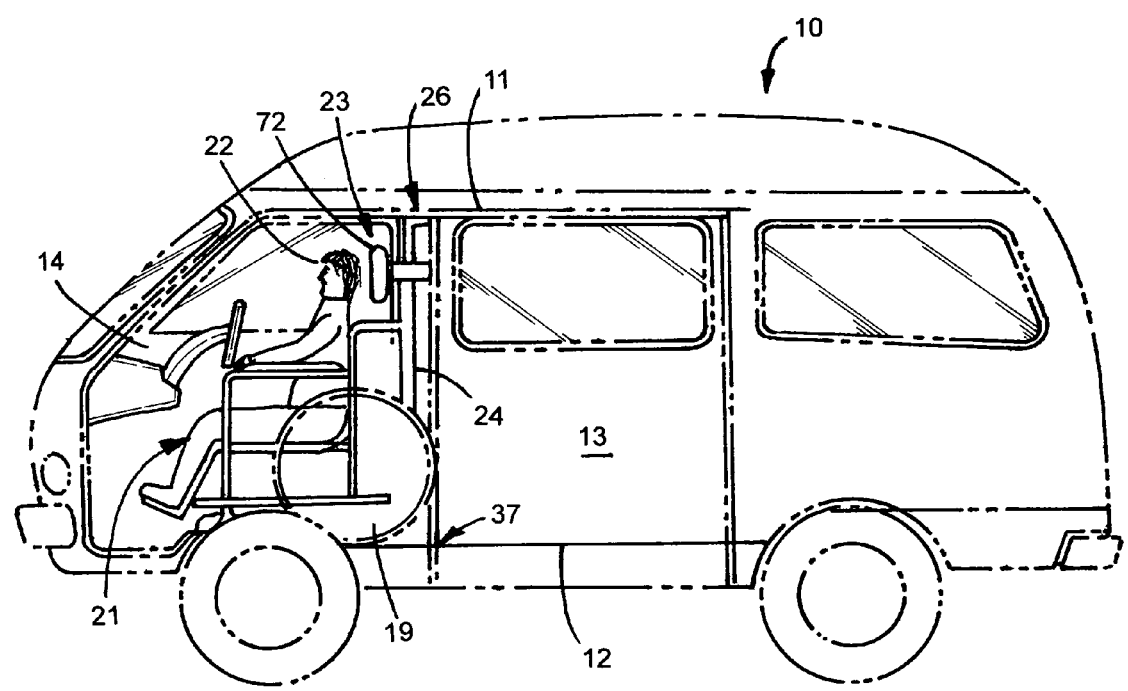
FIG. 1 is a side elevational view of a motor vehicle having a headrest assembly for a person in a wheelchair located in the vehicle operator position.
Figure 2:
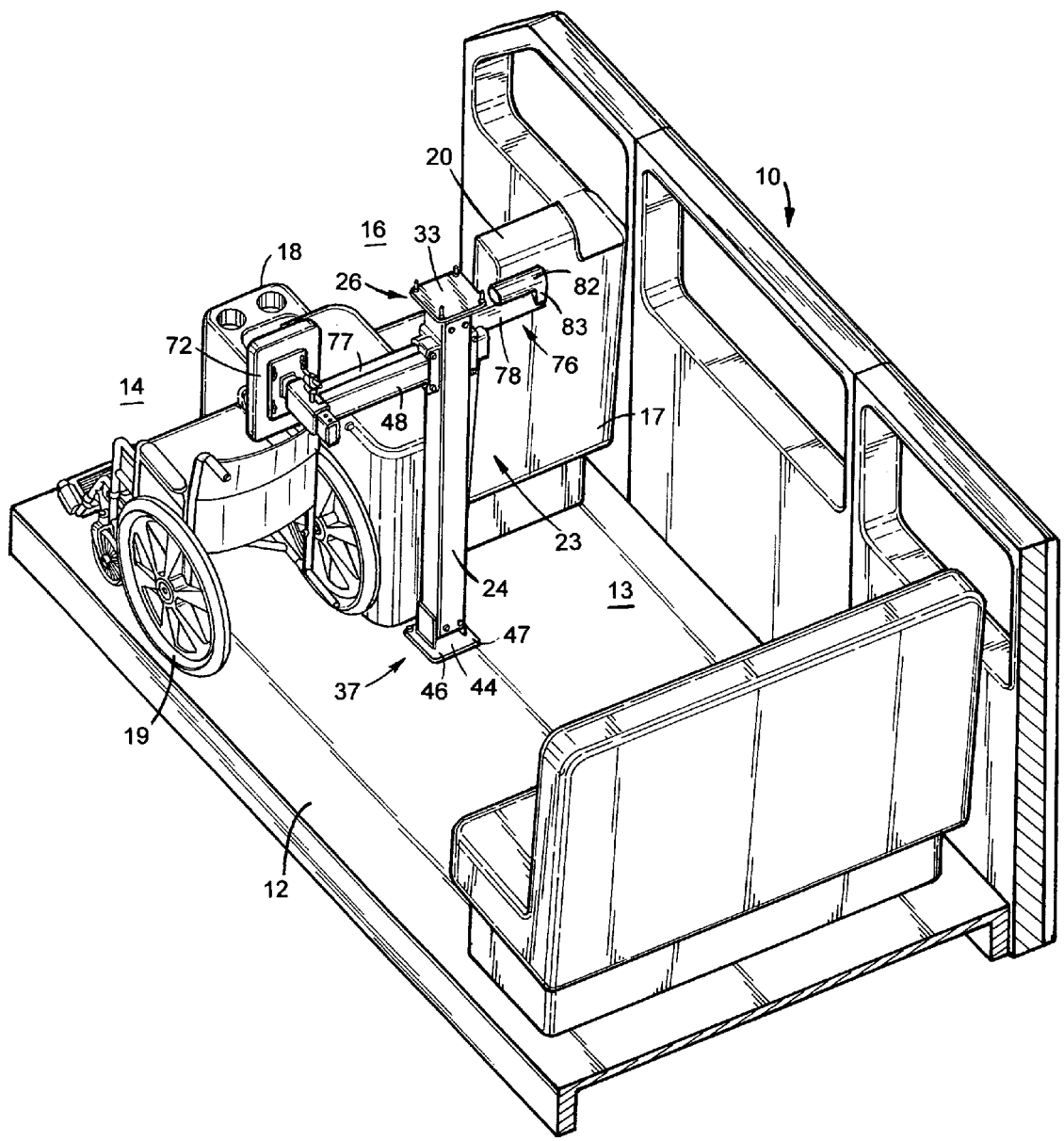
FIG. 2 is a perspective of the interior of the motor vehicle and headrest assembly of FIG. 1.
Figure 3:
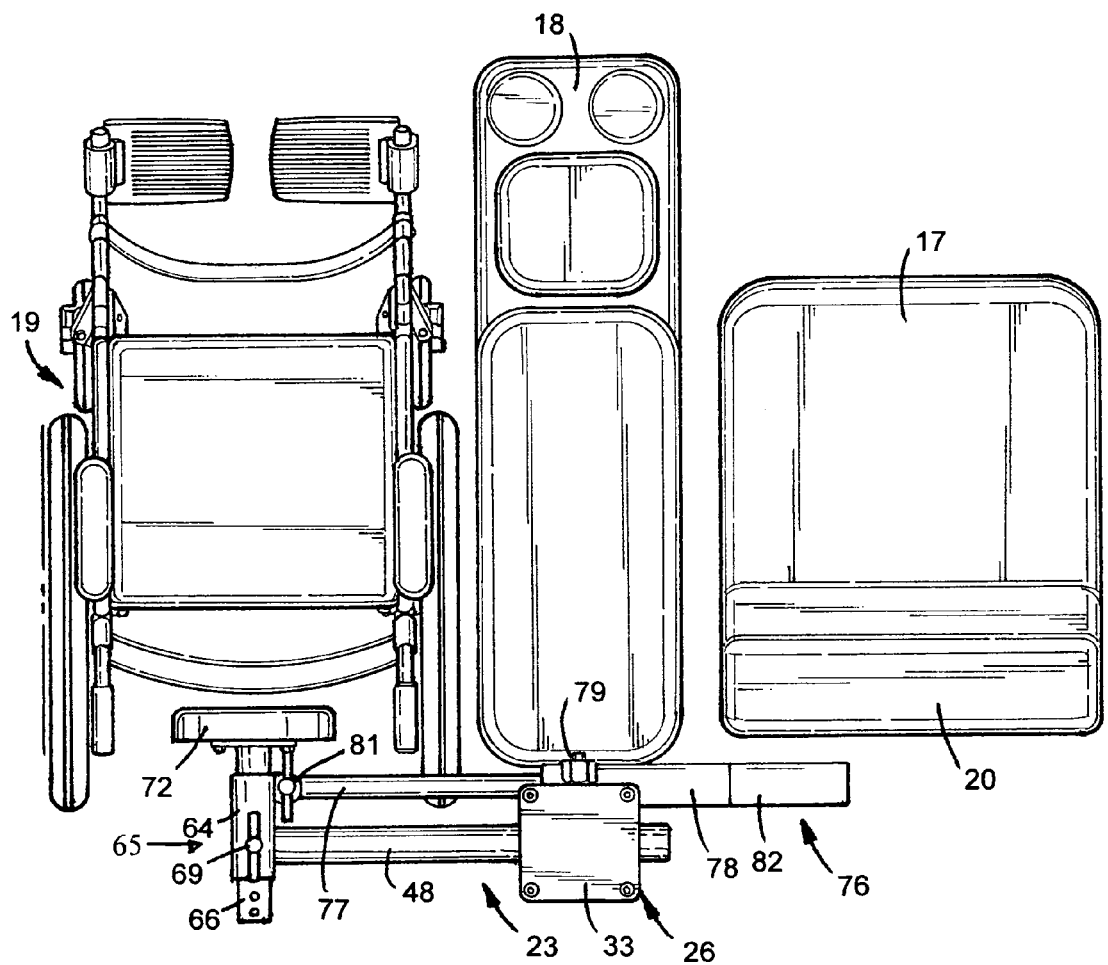
FIG. 3 is an enlarged top plan view of the headrest assembly and wheelchair located in the vehicle driver's position of the motor vehicle.
Figure 5:
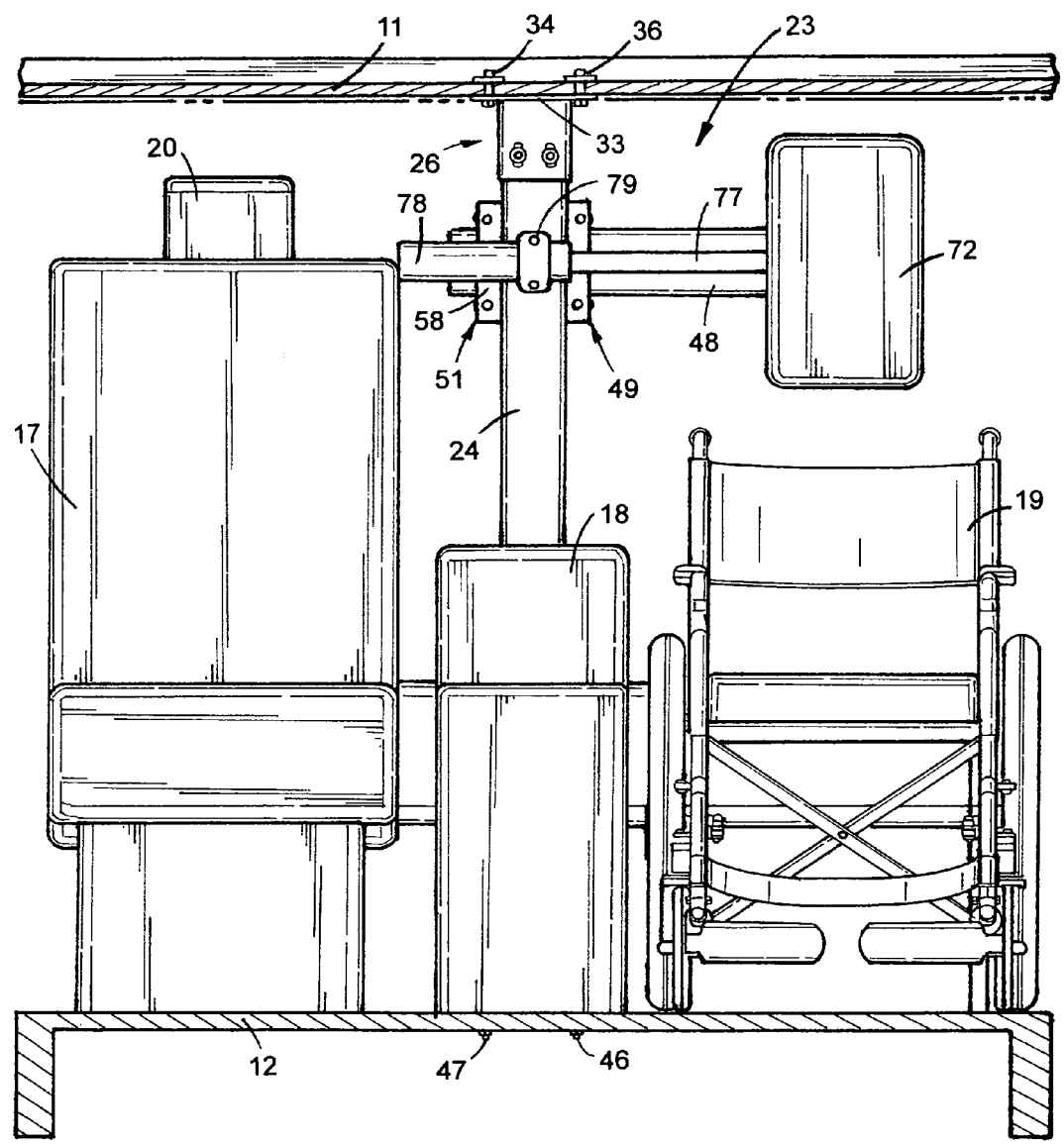
FIG. 5 is a front elevational view of the headrest assembly and wheelchair.
Figure 6:
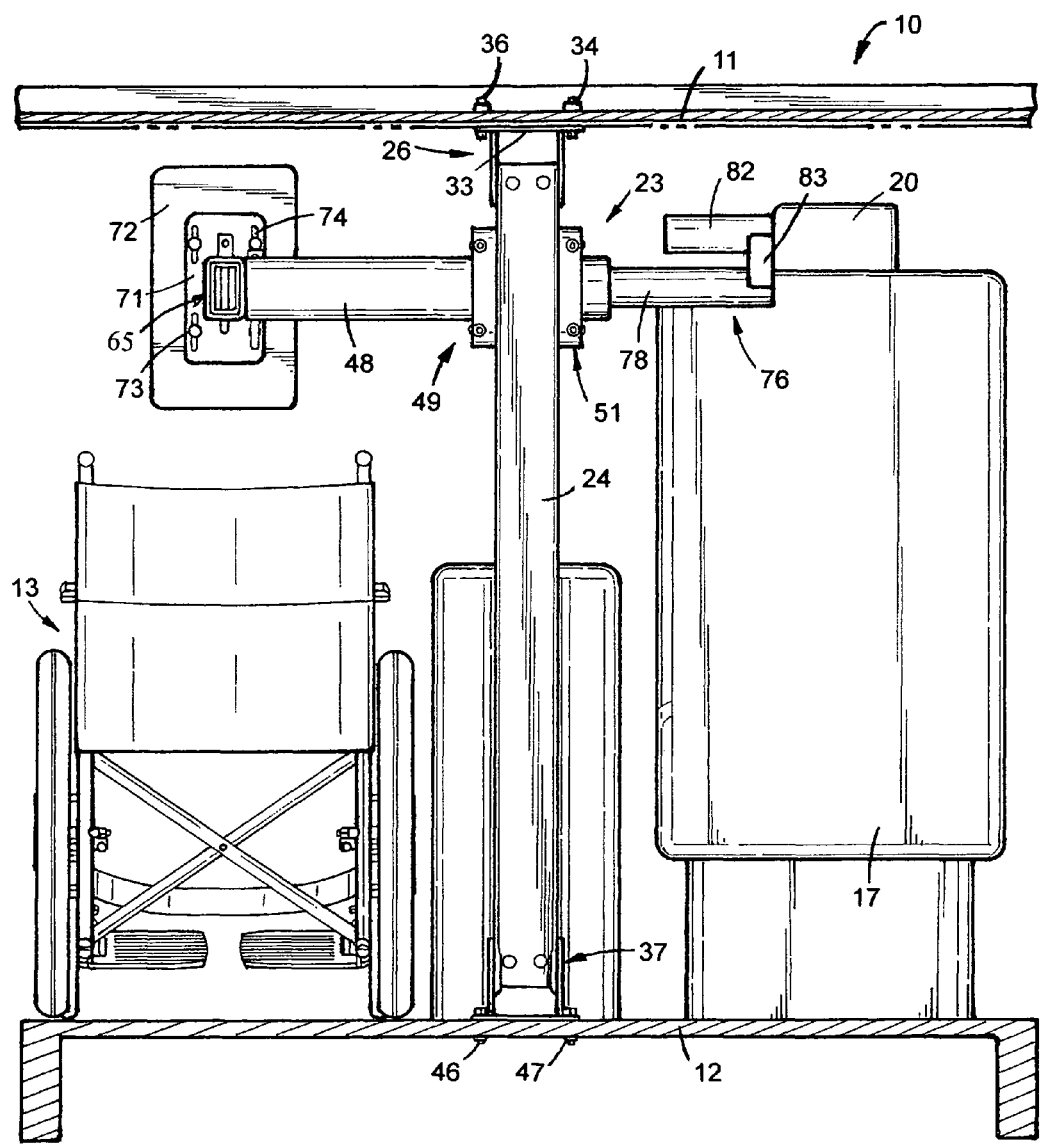
FIG. 6 is a rear elevational view of the headrest assembly and wheelchair.

A motor vehicle 10, shown in FIGS. 1, 2 and 5, is equipped with a headrest assembly 23 for a person 22 in a wheelchair 19. The wheelchair can be a powered wheelchair as disclosed by P. E. Schlangen in U.S. Pat. No. 6,375,209. Motor vehicle 10, shown as a utility vehicle or van, has a roof panel or frame 11 and a horizontal floor 12. Other types of motor vehicles including motor homes can accommodate headrest assembly 23. An interior compartment 13 of vehicle 10 has an operator or driver's location 14 and a front passenger location 16 separated with a console 18. A conventional seat 17 with a headrest 20 is secured to floor 12 in passenger location 16. Motor vehicle 10 can be a pickup truck equipped with a wheelchair lift mechanism.

Examples of motor vehicles with wheelchair lift mechanisms are disclosed in U.S. Pat. No. 6,726,435 and U.S. Patent Publication No. US 2011/0070057. Headrest assemblies are not included in these wheelchair lift mechanisms or the vehicles associated with these wheelchair lift mechanisms.

Figure 4:
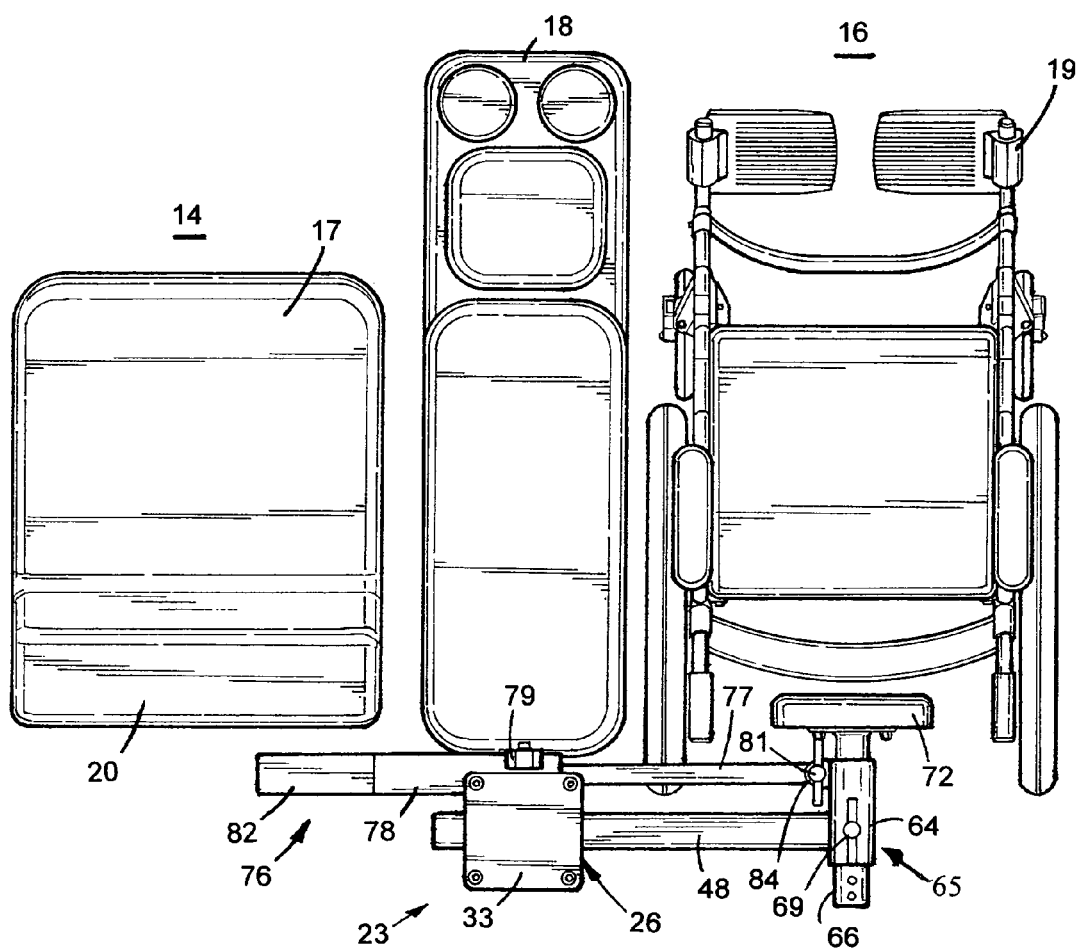
FIG. 4 is an enlarged top plan view of the headrest assembly and wheelchair located in the front passenger position of the motor vehicle.

Wheelchair 19 accommodates a person 21 in a position to operate vehicle 10. A wheelchair restraining device attached to floor 12 locks onto the wheelchair 19 to prevent it from moving on floor 12. One wheelchair restraining device is disclosed in U.S. Pat. No. 6,352,396, incorporated herein by reference. The person's head 22 is located in front of a headrest restraint pad 72 of the headrest assembly 23. The back of the person's head 22 is horizontally aligned with the central section of pad 72 to provide potential whiplash protection. As shown in FIG. 4, wheelchair 19 is located in the front passenger location 19 with a conventional seat 17 having a headrest 20 located in the vehicle operator's position. The restraint pad 72 located above the rear or back of wheelchair 19 is adapted to be horizontally aligned in close proximity with the back of a person's head when the person is seated in the wheelchair. Conventional seat belts are used to maintain the person in wheelchair 19.

A shown in FIGS. 2, 5, 6 and 7, headrest assembly 23 has an upright pillar, post or column 24 having an upper end secured to a top connector 26 and a lower end secured to a bottom connector 37. Top connector 26 includes a U-shaped member 27 located around the upper end of column 24. Bolts 31 and 32 extended through vertical slots 28 and 29 secure column to U-shaped member 27. Slots 28 and 29 allow for vertical adjustment of U-shaped member 27 on column 24. A plate 33 secured to the top of U-shaped member 27 is attached with bolts 34 and 36 to roof frame 11. Other structures including but not limited to U-bolts can be used to secure the upper end of column 24 to roof frame 11. The bottom connector 37 includes a U-shaped member 38 having upright slots 39 and 41 accommodating bolts 42 and 43 that secure connector 37 to the bottom of column 24. Slots 39 and 41 allow for vertical adjustment of U-shaped member 38 on column 24. The adjustments of U-shaped members 27 and 38 on column 24 compensate for variations in the distance between roof frame 11 and floor 12 of vehicle 10. Connectors 26 and 37 mount column 24 in a fixed upright location adjacent the back of console 18. Column 24 is in a central location on floor 12 behind and between operator and passenger location 14 and 16. The location of column 25 on floor 12 can vary to allow wheelchair 19 to be moved into and out of vehicle operator location 14 or passenger location 16 of vehicle 10. Column 24 can be secured to only roof frame 11 or floor 12 of vehicle 10 to retain column in a fixed location on vehicle 10.

Figure 7:
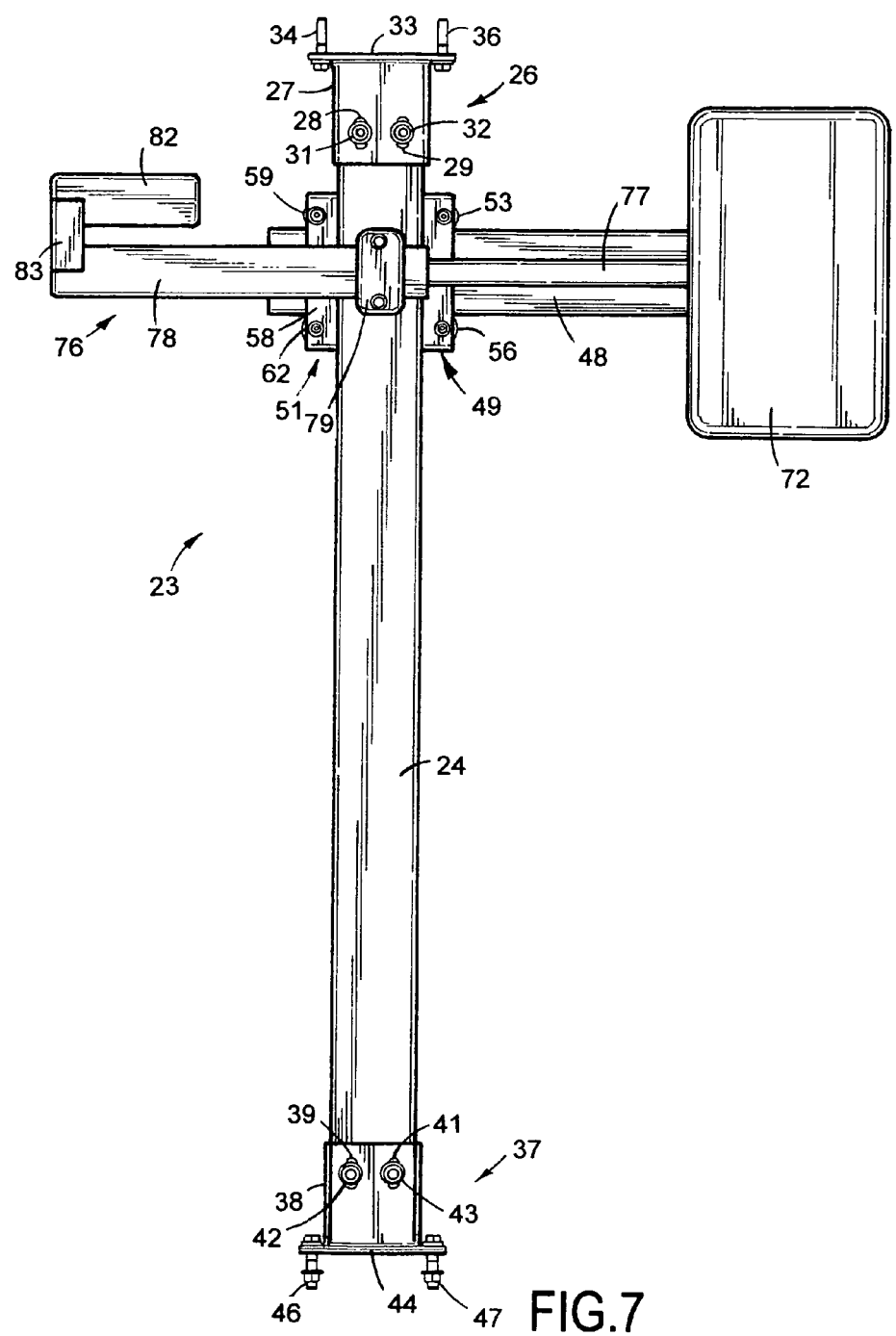
FIG. 7 is a front elevational view of the headrest assembly.
Figure 8:
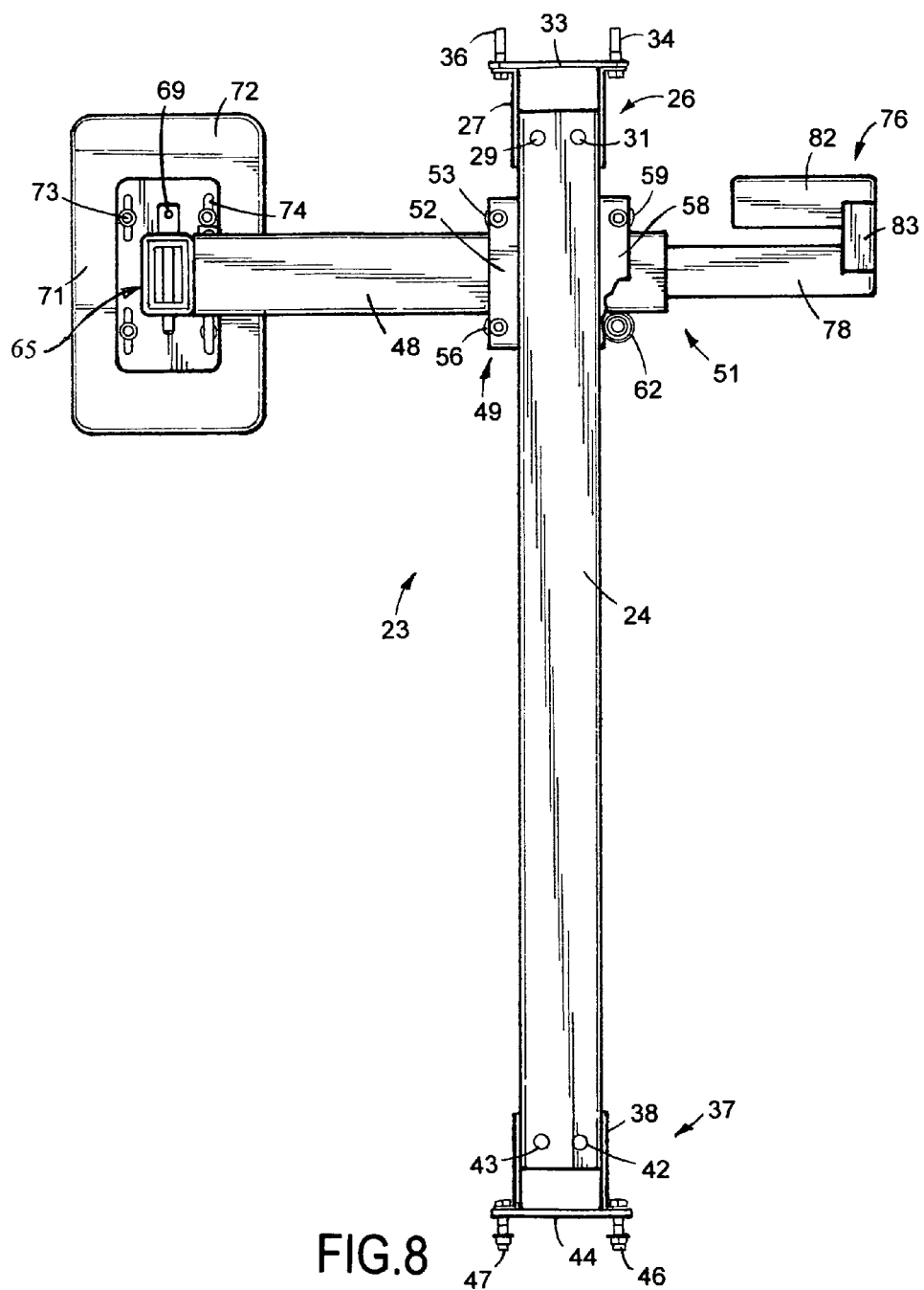
FIG. 8 is a rear elevational view of the headrest assembly.
Figure 9:
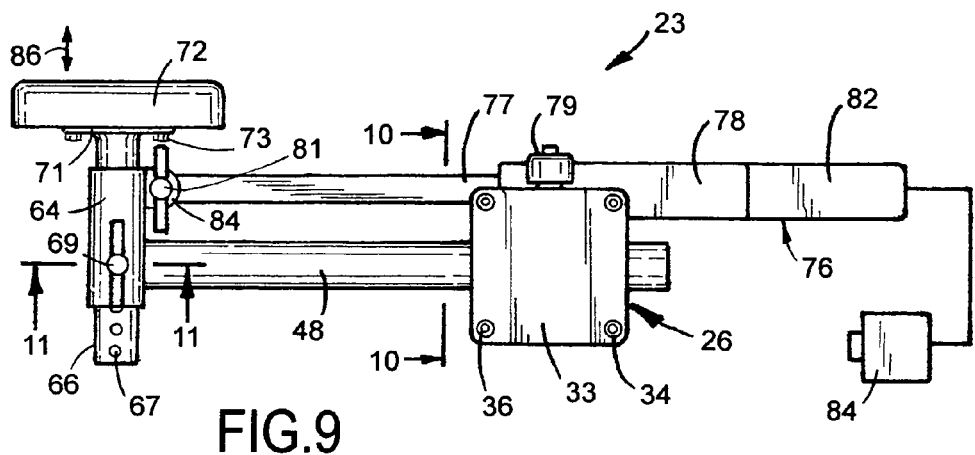
FIG. 9 is a top plan view of the headrest assembly.
Figure 10:
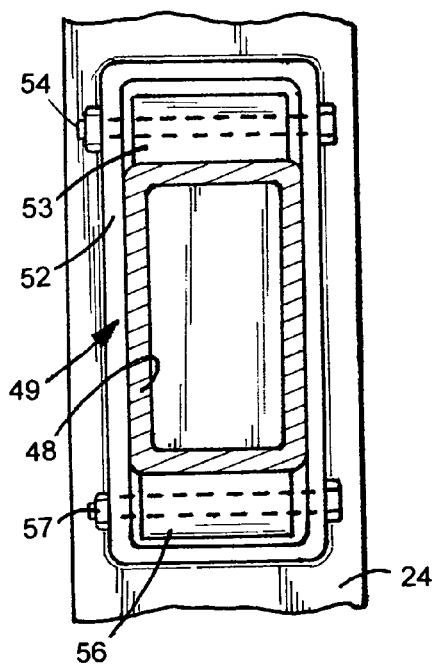
FIG. 10 is an enlarged sectional view taken along the line 10-10 of FIG. 9.

As shown in FIGS. 6 to 9, a horizontal arm 48 extended laterally from column 24 supports head restraint pad 72 in vehicle operator position 14 behind wheelchair 19. Arm 48 is a tubular member that extends through an opening in the sides of column 25. Supports 49 and 51 secured to opposite sides of column 24 retain arm 48 on column 24 for lateral movements between an extended first position, shown in FIG. 12, to a retracted second position, shown in FIG. 13. Referring to FIG. 10, support 49 has a box member 52 secured with welds to one side of column 24. An upper cylindrical roller 53 located in box member 52 engages the top surface of arm 48. A bolt or axle 54 rotatably mounts roller 53 on the side walls of box member 52. A lower cylindrical roller 56 engages the bottom surface of arm 48. A bolt or axle 57 mounts roller 56 on the side walls of box member 52. The side walls of arm 48 are located in sliding surface engagement with the inside surfaces of the side walls of box member 52 to prevent angular or swinging movement of arm 48 relative to column 24. Support 51 has the same box member and rollers as support 49. As shown in FIGS. 7 and 8, support 51 comprises a box member 58 secured with welds to the side of column opposite box member 52. Upper and lower rollers 59 and 62 are rotatably mounted with bolts or axles 61 and 63 on box member 58 with roller 59 in engagement with the top surface of arm 48 and roller 62 in engagement with the bottom surface of arm 48. Arm 48 rides on rollers 53, 56 and 59, 62 during movement between first extended and second retracted positions. Roller 53, 56 and 59, 62 prevent arm 48 from angular or swinging movement in a vertical plan relative to column 24.

Figure 11:
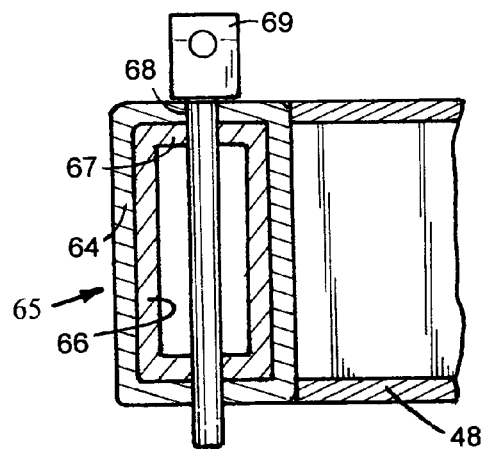
FIG. 11 is an enlarged sectional view taken along line 11-11 of FIG. 9.

An attachment 65 connected to arm 48 supports a head restraint pad 72 in a first position in close proximity to the back of the head of the person seated in wheelchair 19 and alternatively in a second position spaced or remote from the head of the person seated in the wheelchair. Attachment 65, head restraint pad 72, and column 24 have combined strength to withstand forces of the head during a vehicle crash to inhibit whiplash injury. Attachment 65 has a first tubular member 64, shown in FIGS. 9 and 11, secured with welds to the outer end of arm 48. Member 64 is located in the horizontal plane of arm 48 and is perpendicular to arm 48. A second tubular member 66 is telescoped through member 64. The outer walls of member 64 are in sliding surface engagement with the inside surfaces of member 64 to limit adjustment of member 66 into only linear movement. Member 66 has a plurality of vertical holes 67 spaced along the length of the top and bottom of the member 66. Member 64 has a hole 68 aligned with a hole 67. As shown in FIG. 11, a lock pin 69 extends through holes 67 and 68 to fix the location of member 66 on member 64. Pin 69 is vertically removable to allow adjustment of the member 66 on member 64.

Figure 13:
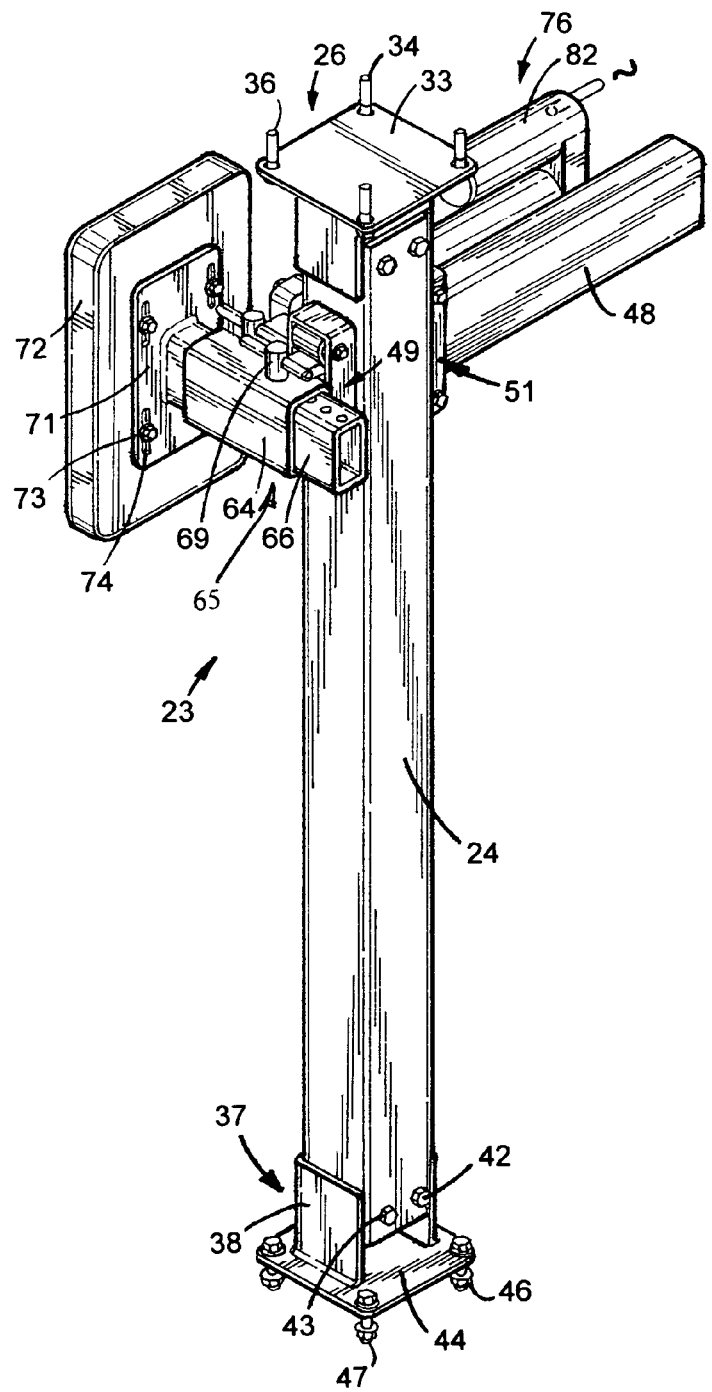
FIG. 13 is a perspective view of the headrest assembly with the head restraint pad in a retracted position.

A flat plate 71, shown in FIGS. 8 and 13, is secured with welds to the forward end of member 66. A cushion or head restraint pad 72, is connected to plate 71 with a plurality of fasteners 73, shown as bolts, extended through vertical slots 74 in plate 71. Fasteners 73 and vertical slots 74 in plate 71 permits vertical adjustment of the location of restraint pad 72. Restraint pad 72 is a headrest that is adjustable in horizontal and vertical positions to accommodate head positions of different vehicle operators.

Figure 12:
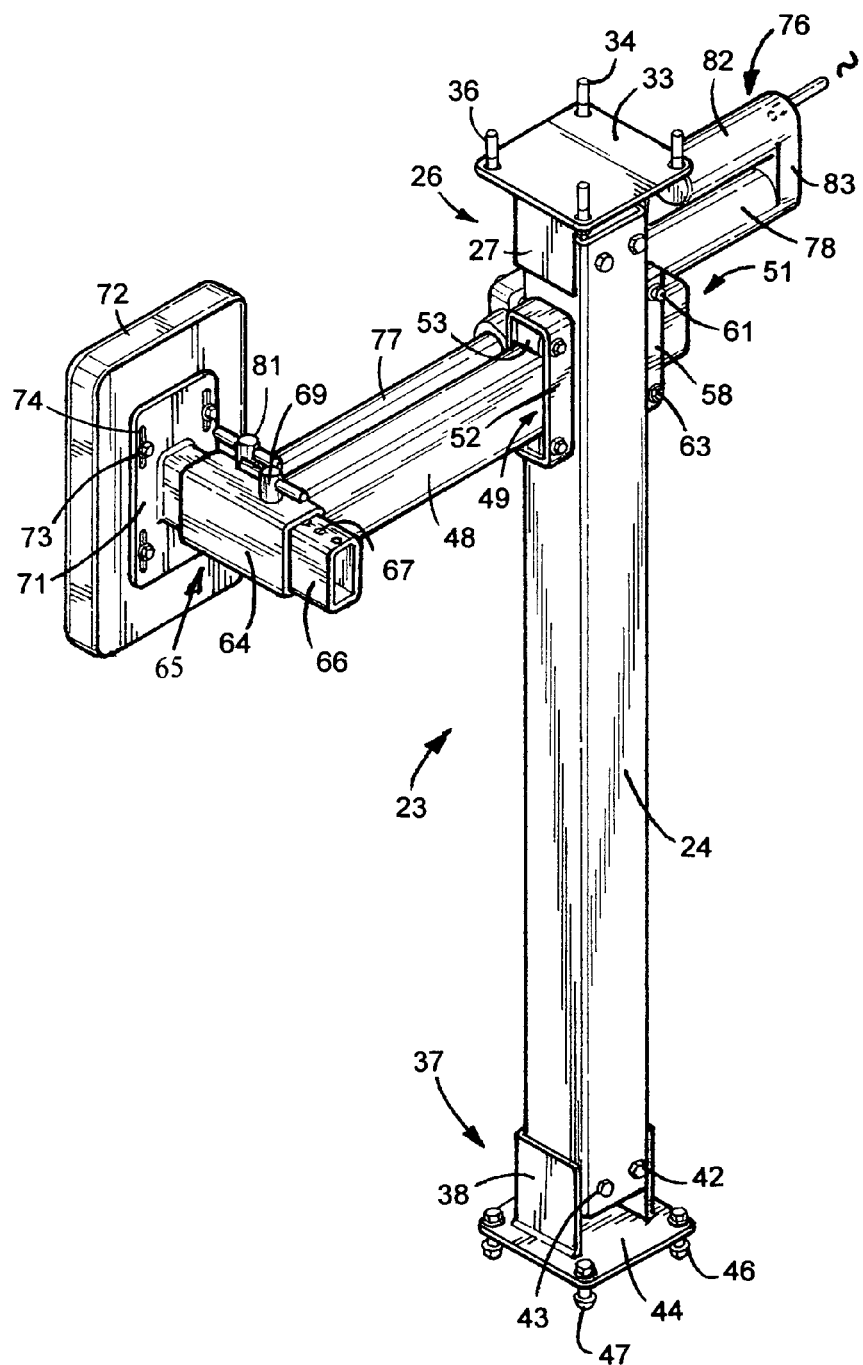
FIG. 12 is a perspective view of the headrest assembly with the head restraint pad in an extended position.

Arm 48 and restraint pad 72 are moved between first extended and second retracted positions with a motion transmission device or actuator 76. As shown in FIGS. 7 and 9, actuator 76 comprises a piston 77 and cylinder 78. A bracket 79 secures cylinder 78 to the front side of column 24. Piston 77, as seen in FIG. 9, has an end located in a U-shaped bracket 84. Bracket 84 is welded to member 64. A pin 81 connects piston 77 to bracket 84. An electric motor 82 mounted on cylinder 78 powers actuator 76. A power transmission 83, such as a chain, belt, thread or gear drive mechanism, drivably couples electric motor 82 to actuator 76. A motor controller 84 wired to electric motor 82 is used by the vehicle operator 22 to control the operation of electric motor 82 to move arm 48 and headrest 72 between extended and retracted positions. Other types of devices can be used to move arm 48 and restraint pad 72 between extended and retracted positions as shown in FIGS. 12 and 13.

Headrest assembly 23 is an adjunct to a motor vehicle, such as a van disclosed by P. E. Schlangen in U.S. Pat. No. 7,735,839; incorporated herein by reference. The wheelchair is first moved into the interior compartment of the vehicle with a lift mechanism or powered into the van of U.S. Pat. No. 7,735,839. Headrest assembly 23 is operated to move arm 48 in the second retracted position, as shown in FIG. 13, to provide access to the vehicle operator's position. The wheelchair with the person seated thereon is then wheeled into the vehicle operator's position behind the steering wheel and adjacent the vehicle controls. After the wheelchair is locked into vehicle operator's position, headrest assembly 23 is actuated to move arm 48 to the second extended position whereby the head restraint pad 72 is located behind the head of the person seated in the wheelchair. The horizontal position of head restraint pad 72 is adjusted to locate the head restraint pad 72 in close proximity to the back of the head of the person seated in the wheelchair to inhibit whiplash in event of a vehicle crash. The distance between head restraint pad 72 and the person's head is adjusted to less than 4 inches.

The headrest assembly has been described and illustrated in the drawing with reference to use in motor vehicles. Modifications, changes of materials and structures and use of the headrest assembly can be made by persons skilled in the art without departing from the invention.

The invention claimed is:

1. A headrest assembly for a motor vehicle having a floor, a roof frame and in interior compartment with a vehicle operator's position for a wheelchair whereby a person seated in the wheelchair can operate the motor vehicle comprising:
an upright column having an upper end and a lower end,
a first connector secured to the upper end of the column adapted to be attached to the roof frame of the vehicle,
a second connector secured to the lower end of the column adapted to be attached to the floor of the vehicle,
a horizontal arm having first and second ends,
first and second supports mounted on the column for maintaining the arm on the column for movement between first and second positions,
an attachment connected to first end of the arm,
a head restraint pad mounted on the attachment adapted to be located behind the head of a person seated in a wheelchair located in the vehicle operator's position when the arm is in the first position, said head restraint pad being spaced from the person's head when the arm is located in the second position to allow the wheelchair and person seated in the wheelchair to be selectively moved into and out of the vehicle operator's position, and
an actuator connected to the column and the attachment operable to move the arm between the first and second positions thereby moving the head restraint pad between a location behind the head of a person seated in the wheelchair to a location spaced from the head of a person seated in the wheelchair.

2. The headrest assembly of claim 1 wherein:
the first and second connector each includes
a U-shaped member fastened to the column,
a plate secured to the U-shaped member, and
fasteners adapted to attach the plate to the floor and roof frame.

3. The headrest assembly of claim 1 wherein:
each support includes
a member secured to the column,
rollers engageable with the arm, and
axles rotatably supporting the rollers on the member.

4. The headrest assembly of claim 1 wherein:
the attachment includes
a first member secured to the first end of the arm,
a second member adjustable mounted on the first member supporting the head restraint pad behind the head of the person seated in the wheelchair,
said second member being adjustable relative to the first member whereby the location of the head restraint pad is adjustable relative to the back of the head of the person seated in the wheelchair located in the vehicle operator's position.

5. The headrest assembly of claim 1 wherein:
the arm includes a flat top wall and a flat bottom wall, said first and second supports include
a first member secured to one side of the column, and
a second member secured to the side opposite the one side of the column,
a first roller located in engagement with the top wall of the arm,
a first axle rotatably mounting the first roller on the first member,
a second roller located in engagement with the bottom wall of the arm,
a second axle rotatably mounting the second roller on the first member,
a third roller located in engagement with the top wall of the arm,
a third axle rotatably mounting the third roller on the second member,
a fourth roller located in engagement with the bottom wall of the arm, and
a fourth axle rotatably mounting the fourth roller on the second member,
said first, second, third and fourth rollers supporting the arm on the column for movement between first and second positions.

6. The headrest assembly of claim 1 wherein:
the attachment includes
a first member located normal to the longitudinal axis of the arm and secured to the first end of the arm,
a second member slidably mounted on the first member,
a lock device for retaining the second member in a selected position on the first member,
a plate secured to the second member,
at least one fastener for attaching the head restraint pad to the plate to locate the head restraint pad behind the head of the person seated in the wheelchair, said second member being adjustable horizontally relative to the first member and head restraint pad being adjustable vertically relative to the plate whereby the location of the head restraint pad is adjustable relative to the back of the head of the person seated in the wheelchair located in the vehicle operator's position.

7. The headrest assembly of claim 1 wherein:
the actuator includes
a piston and cylinder assembly connected to the column and attachment operable to move the arm between the first and second positions, and
a motor drivably connected to the piston and cylinder assembly to operate the piston and cylinder assembly to move the arm and head restraint pad between the first and second positions.

8. A headrest assembly for a motor vehicle having a floor and an interior compartment with a vehicle operator's position for a wheelchair whereby a person seated in the wheelchair can operate the motor vehicle comprising:
an upright column,
a connector secured to the column adapted to be attached to the vehicle,
an arm movable between first and second positions,
at least one support mounted on the column for maintaining the arm on the column for movement between said first and second positions,
an attachment connected to the arm,
a head restraint pad mounted on the attachment adapted to be located behind the head of a person seated in a wheelchair located in the vehicle operator's position when the arm is in the first position, said head restraint pad being spaced from the person's head when the arm is located in the second position to allow the wheelchair and person seated in the wheelchair to be selectively moved into and out of the vehicle operator's position; and
an actuator operable to move the arm between the first and second positions thereby moving the head restraint pad between a location behind the head of a person seated in the wheelchair to a location spaced from the head of a person seated in the wheelchair.

9. The headrest assembly of claim 8 wherein:
the connector includes
a U-shaped member fastened to the column,
a plate secured to the U-shaped member, and
fasteners adapted to attach the plate to the floor of the vehicle.

10. The headrest assembly of claim 8 wherein:
the support includes
a member secured to the column,
rollers engageable with the arm, and
axles rotatably supporting the rollers on the member.

11. The headrest assembly of claim 8 wherein:
the attachment includes
a first member secured to the arm,
a second member adjustable mounted on the first member supporting the head restraint pad behind the head of the person seated in the wheelchair,
said second member being adjustable relative to the first member whereby the location of the head restraint pad is adjustable relative to the back of the head of the person seated in the wheelchair located in the vehicle operator's position.

12. The headrest assembly of claim 8 wherein:
the arm includes a flat top wall and a flat bottom wall,
said support includes
a member secured to the column,
a first roller located in engagement with the top wall of the arm,
a first axle rotatably mounting the first roller on the member,
a second roller located in engagement with the bottom wall of the arm, and
a second axle rotatably mounting the second roller on the member.

13. The headrest assembly of claim 8 wherein:
the attachment includes
a first member located normal to the longitudinal axis of the arm and secured to the arm,
a second member slidably mounted on the first member,
a lock device for retaining the second member in a selected position on the first member,
a plate secured to the second member,
at least one fastener for attaching the head restraint pad to the plate to locate the head restraint pad behind the head of the person seated in the wheelchair, said second member being adjustable horizontally relative to the first member and head restraint pad being adjustable vertically relative to the plate whereby the location of the head restraint pad is adjustable relative to the back of the head of the person seated in the wheelchair located in the vehicle operator's position.

14. The headrest assembly of claim 8 wherein:
the actuator includes
a piston and cylinder assembly connected to the column and attachment operable to move the arm between the first and second positions, and
a motor drivably connected to the piston and cylinder assembly to operate the piston and cylinder assembly to move the arm and head restraint pad between the first and second positions.

15. The headrest assembly of claim 8 including:
at least one fastener securing the connector to the floor of the vehicle to retain the column in an upright position.

16. The headrest assembly of claim 8 wherein:
the motor vehicles includes a roof frame, and at least one fastener securing the connector to the roof frame of the vehicle to retain the column in an upright position.

17. A headrest assembly for a motor vehicle having a floor, and an interior compartment with a vehicle operator's position and a front passenger position for a wheelchair whereby a person seated in the wheelchair can be in the front passenger position of the vehicle comprising:
an upright column,
a connector secured to the column adapted to be attached to the vehicle,
an arm movable between first and second positions,
at least one support mounted on the column for maintaining the arm on the column for movement between said first and second positions,
an attachment connected to the arm,
a head restraint pad mounted on the attachment adapted to be located behind the person seated in the wheelchair located in front passenger position when the arm is in the first position, said head restraint pad being spaced from the person's head when the arm is located in the second position to allow the wheelchair and person seated in the wheelchair to be selectively moved into and out of the front passenger position of the vehicle, and an actuator operable to move the arm between the first and second positions thereby moving the head restraint pad between a location behind the head of a person seated in the wheelchair to a location spaced from the head of a person seated in the wheelchair.

18. The headrest assembly of claim 17 wherein:
the connector includes
a U-shaped member fastened to the column,
a plate secured to the U-shaped member, and
fasteners adapted to attach the plate to the floor of the vehicle.

19. The headrest assembly of claim 17 wherein:
the support includes
a member secured to the column, rollers engageable with the arm, and
axles rotatably supporting the rollers on the member.

20. The headrest assembly of claim 17 wherein:
the attachment includes
a first member secured to the arm,
a second member adjustable mounted on the first member supporting the head restraint pad behind the head of the person seated in the wheelchair,
said second member being adjustable relative to the first member whereby the location of the head restraint pad is adjustable relative to the back of the head of the person seated in the wheelchair located in the vehicle operator's position.

21. The headrest assembly of claim 17 wherein:
the arm includes a flat top wall and a flat bottom wall,
said support includes
a member secured to one side of the column,
a first roller located in engagement with the top wall of the arm,
a first axle rotatably mounting the first roller on the member,
a second roller located in engagement with the bottom wall of the arm, and
a second axle rotatably mounting the second roller on the member.

22. The headrest assembly of claim 17 wherein:
the attachment includes
a first member located normal to the longitudinal axis of the arm and secured to the arm,
a second member slidably mounted on the first member,
a lock device for retaining the second member in a selected position on the first member,
a plate secured to the second member,
at least one fastener for attaching the head restraint pad to the plate to locate the head restraint pad behind the head of the person seated in the wheelchair, said second member being adjustable horizontally relative to the first member and head restraint pad being adjustable vertically relative to the plate whereby the location of the head restraint pad is adjustable relative to the back of the head of the person seated in the wheelchair located in the vehicle operator's position.

23. The headrest assembly of claim 17 wherein:
the actuator includes
a piston and cylinder assembly connected to the column and attachment operable to move the arm between the first and second positions, and
a motor drivably connected to the piston and cylinder assembly to operate the piston and cylinder assembly to move the arm and head restraint pad between the first and second positions.

24. The headrest assembly of claim 17 including:
at least one fastener securing the connector to the floor of the vehicle to retain the column in an upright position.

25. The headrest assembly of claim 17 wherein:
the motor vehicles includes a roof frame, and at least one fastener securing the connector to the roof frame of the vehicle to retain the column in an upright position.

* * * * *